United States Patent [19]
Pratt et al.

[11] Patent Number: 6,161,148
[45] Date of Patent: Dec. 12, 2000

[54] COMPUTER METHOD AND APPARATUS FOR INTERACTIVE OBJECTS CONTROLS

[75] Inventors: John M. Pratt, Atkinson; Richard Sontag, Merrimack, both of N.H.

[73] Assignee: Kodak Limited, Hemel Hempstead, United Kingdom

[21] Appl. No.: 08/722,366

[22] Filed: Sep. 27, 1996

[51] Int. Cl.[7] ........................................... G06F 9/00
[52] U.S. Cl. ............................................ 709/315
[58] Field of Search ......................... 709/300, 302, 709/303, 310, 315, 316

[56] References Cited

U.S. PATENT DOCUMENTS 5,870,088  2/1999  Washington et al. ................. 345/326

OTHER PUBLICATIONS

Richter, Jeffrey, "Advanced Windows NT," Microsoft Press, pp. 141–171, 1994.
O'Brien, Timothy, "Java/ActiveX Rivalry Will Subside As Market Pressures Force Interoperability" Object Magazine, pp. 18–20, Aug. 1996.
Brockschmidt, Kraig, "How OLE and COM Solve the Problems of Component Software Design," Microsoft Systems Journal, p.(27), 1995.
"ISIS EZ–Imaging™ Information," pp. 1–4, downloaded Dec. 5, 1996.
"ActiveX FAQ," http://www.microsoft.com/activex/actx–gen/faq.htm, Aug. 12, 1996.
"What is ActiveX," http:/www.microsoft.com/activex/actx–gen/awhatis.htm, Jul. 16, 1996.
"Frequently Asked Questions about Developing Web Pages Using ActiveX Controls," http:/www.microsoft.com/intdev/controls/ctrlfaq.htm, Jun. 25, 1996.
"ActiveX Controls," http:/www.microsoft.com/intdev/controls/controls.htm#eictrl, May 24, 1996.
"ActiveX Controls Framework: Sample Code for Authoring Non–MFC Controls," http://www.microsoft.com/intdev/controls/ctrlfmk.htm, Apr. 1996.
"ActiveX Scripting, Basic Architecture," http://www.microsoft.com/intdev/sdk/docs/olescrpt/local002.htm, downloaded Aug. 9, 1996.
"ActiveX Scripting, The ActiveX Scripting Site Object," http://www.microsoft.com/intdev/sdk/docs/olescript/local003.htm, downloaded Aug. 9, 1996.
"ActiveX Scripting, The ActiveX Scripting Site Object," http://www.microsoft.com/intdev/dks/docs/olescrpt/local004.htm, downloaded Aug. 9, 1996.
"Component Object Model Specification," http://www.microsoft.com/intdev.sdk/docs/com/comintro.htm, Oct. 24, 1995.
"Wang Software—Introduction to Document Imaging," http:/www.wang.com/sbu/imgpaper.htm, downloaded Sep. 3, 1996.

(List continued on next page.)

*Primary Examiner*—Majid A. Banankhah
*Assistant Examiner*—St. John Courtenay, III
*Attorney, Agent, or Firm*—Hamilton, Brook, Smith & Reynolds, P.C.

[57] ABSTRACT

A computer method and apparatus enable object-linking-and-embedding controls to directly communicate with each other and share resources. The computer method and apparatus thereby relieve the container application containing the controls, from accessing controls and managing communications from one control to another. The invention method and apparatus employ a file in global shared memory. The memory mapped file holds pointers for controls to directly access other controls. Using the memory mapped file, a control object is able to directly call methods and access properties of desired other control objects. The memory mapped file also holds a window handle for each control, enabling another control to directly access a working screen view supported by the respective control.

22 Claims, 5 Drawing Sheets

OTHER PUBLICATIONS

"Wang Software/Imaging for Windows Fact Sheet," http://www.wang.com/sbu/factsh/htm, downloaded Sep. 3, 1996.

Wang Software—Imaging for Windows 95 OLE Controls, http://www.wang.com/sbu/ocxmsdn.htm, downloaded Sep. 3, 1996.

"Wang Software—Imaging for Windows Frequently Asked Questions," http://www.wang.com/sbu/i4wfaq3.htm, downloaded Sep. 4, 1996.

"Wang Laboratories, Inc./Press Release," http://www.wang.com/pressrel/p96073lt.htm, downloaded Sep. 12, 1996.

"Wang Software/ActiveX Controls FAQs," http://www.wang.com/sbu/i4wfaq3.htm, downloaded Sep. 12, 1996.

COMPUTER METHOD AND APPARATUS FOR INTERACTIVE OBJECTS CONTROLS

BACKGROUND OF THE INVENTION

Over the past few years, object oriented programming has significantly improved the way businesses use and apply applications programs. There remain however a number of issues in fully automating business. The major issues stem from the fact that most business information is in the form of paper documents. One problem associated with maintaining paper documents is that paper does not integrate well with computer systems. For example, computers can track large amounts of customer data. Computer-based data can be used to easily locate information such as customers' account profiles and shipment records, while paper-based documents bearing an original signature for example are often misplaced when most needed. Further paper documents and paper captured information are typically stored/filed separately from other data and companion documents in contrast to computer-held information and documents.

As such, document imaging is a major area of concern in business automation, particularly with regard to implementing object oriented programming concepts. Document imaging is a technology that converts paper documents/information into electronic form, where storage, retrieval and use of the document can be automated using standard computer technology. By capturing paper documents as electronic images stored by the computer, all the benefits and power of database, e-mail, network, facsimile and memory storage technology can be applied to what was once manually processed information.

On the other hand, however, object oriented programming lacks standards or protocols which transport objects or data from one application regime to another. That is, although image documents can be electronically filed using multiple index and filing methods, and then quickly searched and retrieved, and subsequently shared among multiple users, each task must be controlled and managed through a common application program.

Microsoft's Object Linking and Embedding (OLE) is a set of standards for building connectable component software. As used herein, "components" are reusable self contained pieces of software that provide a stand-alone function, such as printing, facsimile transmission, etc. As such, components can be plugged into (i.e., conjoined with) other components to form a working system as desired. In distinction, an "object" is a programming entity comprising some state and a set of defined behaviors. The state is represented by data (properties) maintained by the object. The behavior is specified in terms of operations, functions or methods that the object can perform. Operations are realized by executable code. Conceptually the data and the code are inextricably bound together in the object. Objects may be "persistent", that is they may continue to exist even though they are inactive or the computer on which they exist has failed or been turned off. Thus a key distinction between objects and components is that an object is a piece of source code or a specification that can be used to build part of an application, while a component is an actual working (stand alone) software module.

OLE allows a degree of integration and interchangeability between software modules that share proprietary knowledge (data). One OLE standard is the Component Object Model (COM) specification, which provides the mechanism for connecting binary object codes of different components. The common element among all standard OLE connections is that they are glued together with COM. Restated, COM is an object-oriented specification for defining interfaces, the contact points between components. To that end, COM provides a foundation on which all OLE features are built.

OLE controls (called OCXs or ACTIVE X) are another type of OLE component standard. OCXs include properties, methods and events which enable programmers to add specific (well defined) functions to application programs. The functions enable end users to perform certain tasks on desired data. Being self contained objects, OCXs are portable and insertable into any container or applications program. A "container application" or an OLE "control container" (and generally an "object container") is any working computer program that is formed of or has defined within it OLE components and objects. For example, Microsoft products such as the Office Suite and Windows 95 are containers. In such a graphical user interface (GUI) environment, as Windows 95, a control is then essentially a special purpose window (i.e., a "child window") which sends messages or event notices to a parent window in the container program.

SUMMARY OF THE INVENTION

OLE Controls (OCXs) are in-process objects, similar to DLLs (dynamic linking libraries) that support various OLE interfaces. Unlike traditional DLLs which can call any function exported in a DLL, OCXs expose methods and properties that can only be accessed by the container of the OCX. That is, the container application serves as a central controller or common manager of the contained OCXs. The container calls on one OCX and obtains resulting data. In turn, the container passes the resulting data to another appropriate OCX for further processing by that OCX, and so forth. The different OCXs are unable to directly access each other. This limitation prevents any communication or re-use of code directly between OCXs.

The present invention relates to an improved computer system in which control objects are able to directly interact with each other to share functions and resources. The preferred method and apparatus of the present invention significantly reduce code complexities on the container level and increase useability of methods and properties located in the various controls of a container.

The computer system of the present invention comprises a plurality of self-contained objects (e.g., control objects), each specifying functions and data elements. Each object is initially defined for access and execution only through a common application program, serving as a working object container in working memory. The present invention, however, enables access to and communications directly between objects, through the use of a memory-mapped file, without engaging the common application program/container in accessing objects. The memory mapped file holds references to the objects in a manner such that a first object is able to directly access a second object through the reference to the second object in the memory-mapped file.

In the preferred embodiment, the object is an OLE control, and the application program is a container program. Communications between the controls are established through a common object model which provides a mechanism for combining the binary codes of different components forming the controls.

In accordance with one aspect of the present invention, the memory-mapped file includes an indication of block length or memory block size of the file. Preferably the memory mapped file is formed of an array of entries for listing indications of the control objects and functional descriptors thereof. There is a different entry for each control object. Each entry is formed of a set of fields including a name field for indicating the respective control object, and other fields for indicating respective functional descriptors. The name field is used to link all controls that communicate with each other. The name field is specified in each control that communicates directly with another control by specifying the name in the special property called "DestControl".

The functional descriptors include a respective window handle for each control object. Each window handle defines screen elements of a viewing window including window size, location and style.

In the preferred embodiment, each entry in the memory mapped file includes a referencing field holding a pointer to the respective control object.

The memory-mapped file enables a control object to invoke the functions and share and update the data elements (e.g., window display) of another control object. The functions include a refresh method. When one of the control objects directly updates a data element (display window) of another control object, the former control object invokes its refresh method and the refresh method of the other control object to serialize (e.g. save data or update display) the updated data element.

Further, the memory-mapped file is provided with a globally recognizable name throughout working memory to enable read-only access by the control objects.

The above and other features of the invention including various novel details of construction and combinations of parts will now be more particularly described with reference to the accompanying drawings and pointed out in the claims. These features are described with reference to installing and maintaining complete applications programs, but may also be used for individual components. It will be understood that the particular devices and methods embodying the invention are shown by way of illustration only and not as limitations of the invention. The principles and features of this invention may be employed in varied and numerous embodiments without departing from the scope of the invention.

BRIEF DESCRIPTION OF THE PREFERRED EMBODIMENTS

Figure 4A:
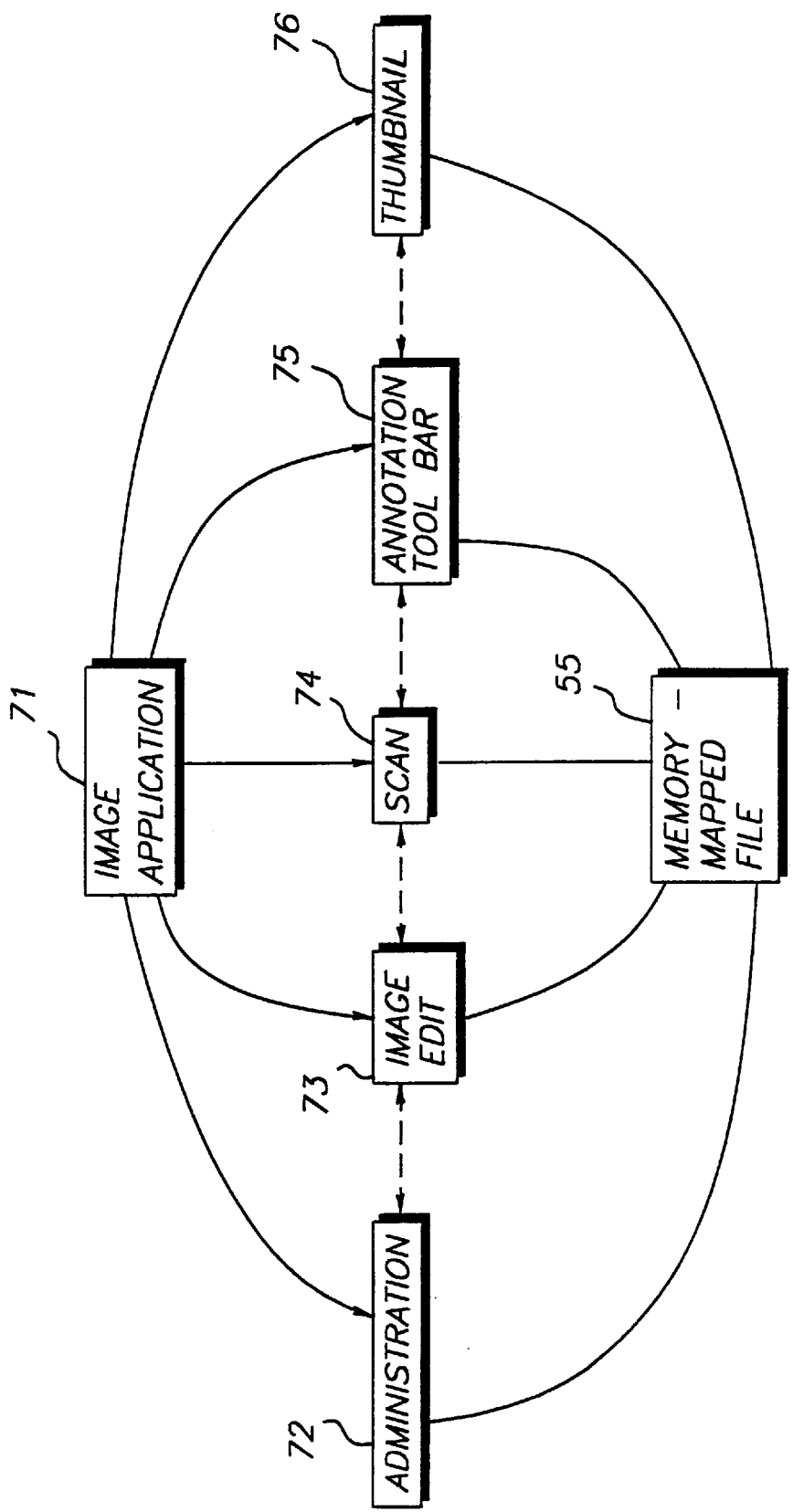
Figure 4B:
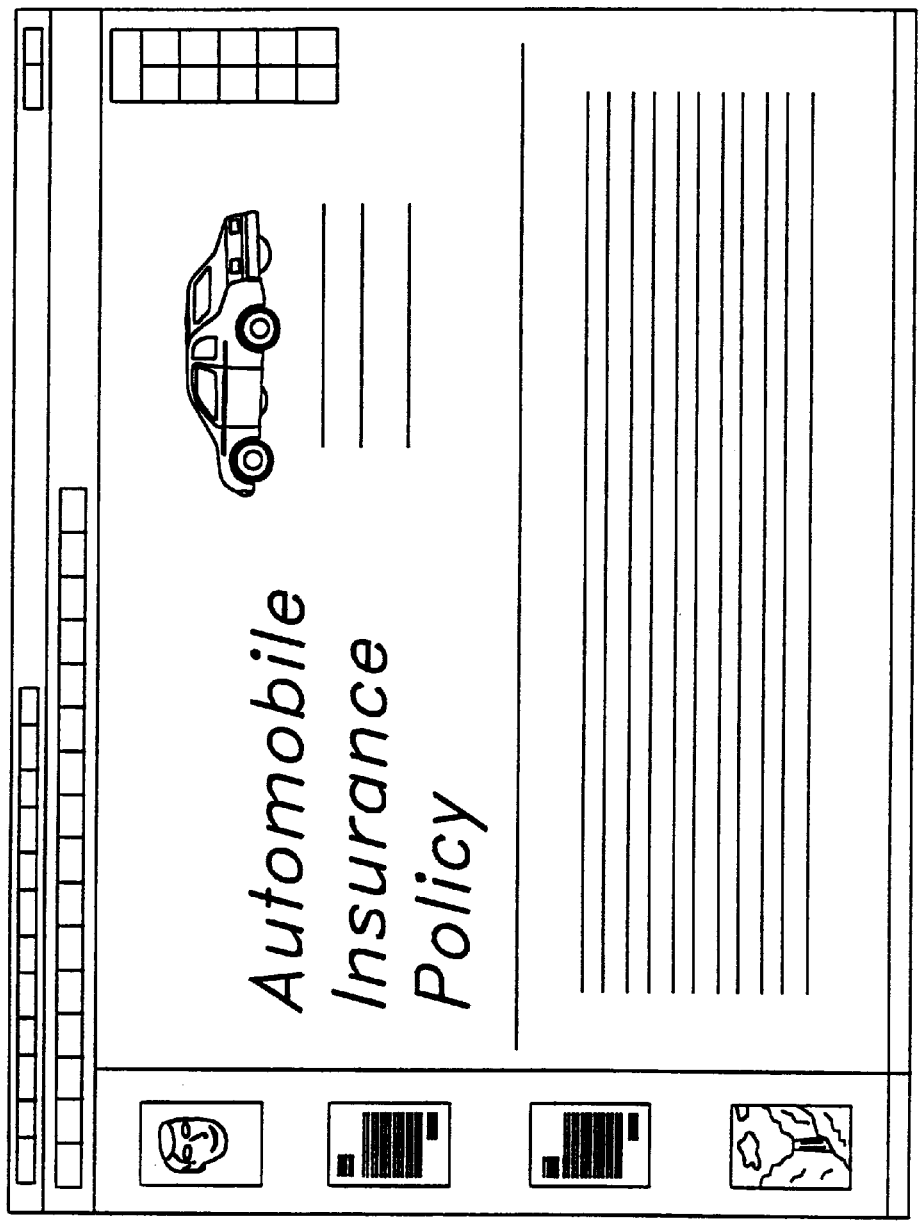

FIGS. 4A and 4B describe an image viewing application which implements the methods and apparatus of the present invention.

DETAILED DESCRIPTION OF THE INVENTION

Figure 1A:
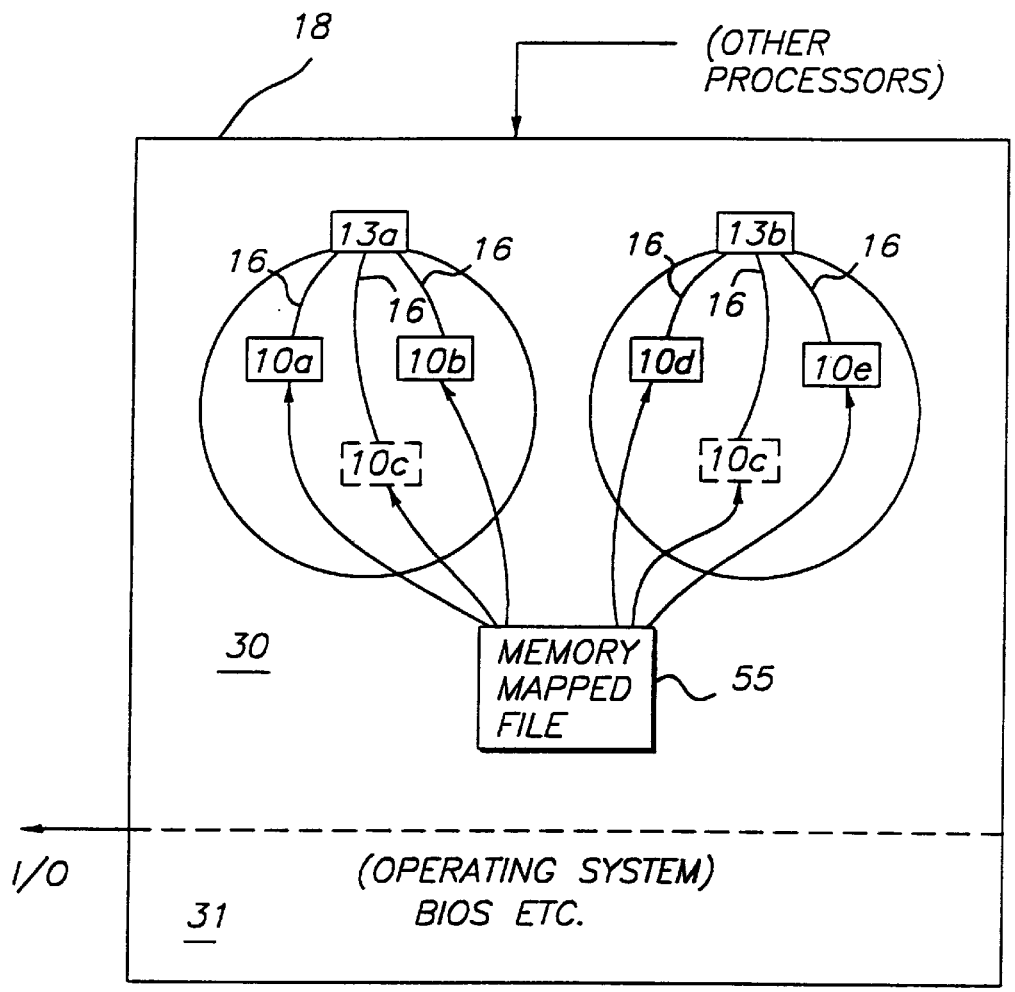
FIGS. 1A and 1B are block diagrams of a computer system embodying the present invention.

Illustrated in FIG. 1 is a computer system and corresponding programming environment in which the present invention apparatus and method are employed. Generally, the computer system is formed of one or more digital processors having coupled thereto I/O accessories such as a keyboard, mouse, monitor and printer. Each digital processor has for example processing capabilities of an Intel XX486 processing chip, or Pentium chip or the like.

In particular, a subject digital processor 18 has (a) a working memory 30 in which applications programs 13 are executed, and (b) a supporting operating system 31 for enabling I/O and other functions (which is not directly affected by the present invention). Each application program 13 is formed of or contains OLE control objects 10, some of which may be shared among (or reside in) plural containers 13. Control object 10c is illustrated by a dashed-line rectangle to indicate shared use by application programs 13a and 13b.

Figure 1B:
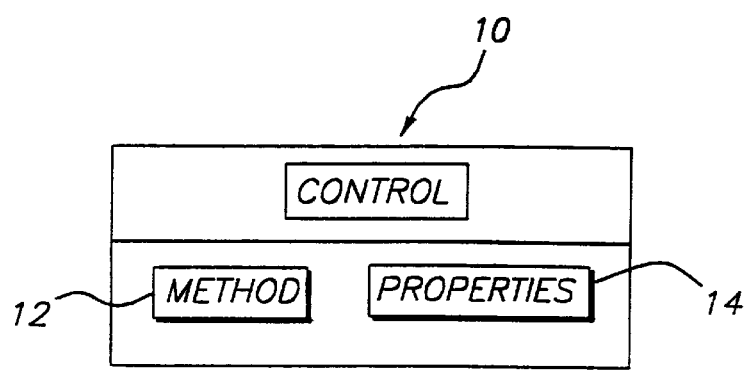

As further illustrated in FIG. 1B, each control object 10 is formed of and defined by (i) a set of methods (or functions and corresponding function calls) 12 and (ii) a set of properties 14 for functionally specifying the object 10. The properties 14 are represented by data elements held in read-only or write-only memory. In the preferred embodiment, the control objects 10 are OCX controls or ActiveX controls or the like. As such as, the controls are in-process objects that support various OLE interfaces 16 (FIG. 1A) such as IDispatch specified by Microsoft. The IDispatch interface 16 provides a pointer to an object 10 which is used (and contained) by the container program 13 to call desired methods or properties of the respective object. As defined by Microsoft, IDispatch presently allows only the OLE container program 13 to gain access to its objects 10 and only its objects.

As a result, unlike other in-process objects, such as dynamic link libraries (DLL) which can call any function exported in any DLL, control objects 10 expose methods and properties that initially can only be accessed by the container 13 of the control objects 10. Heretofore, this limitation prevented any communication or re-use of code between control objects 10. That is, in the prior art, in order for a user or application to use a set of related controls, each control was initiated and controlled separately through the container level. This required user code (a) to provide access to individual methods and properties in each control object, (b) to process the information, and (c) to send the information to each control object.

In the present invention, each control object 10 itself has access to IDispatch, to directly communicate with other control objects 10 and to directly call the methods 12 and properties 14 of desired control objects 10. That is, the present invention provides each control object 10 with the IDispatch pointers to the other control objects 10 to enable direct intercommunication between control objects 10. As such, the present invention enables reuse of control objects 10 (and specifically their methods 12 and properties 14) directly by other control objects 10 in the application program 13 containing the objects 10.

Figure 2:
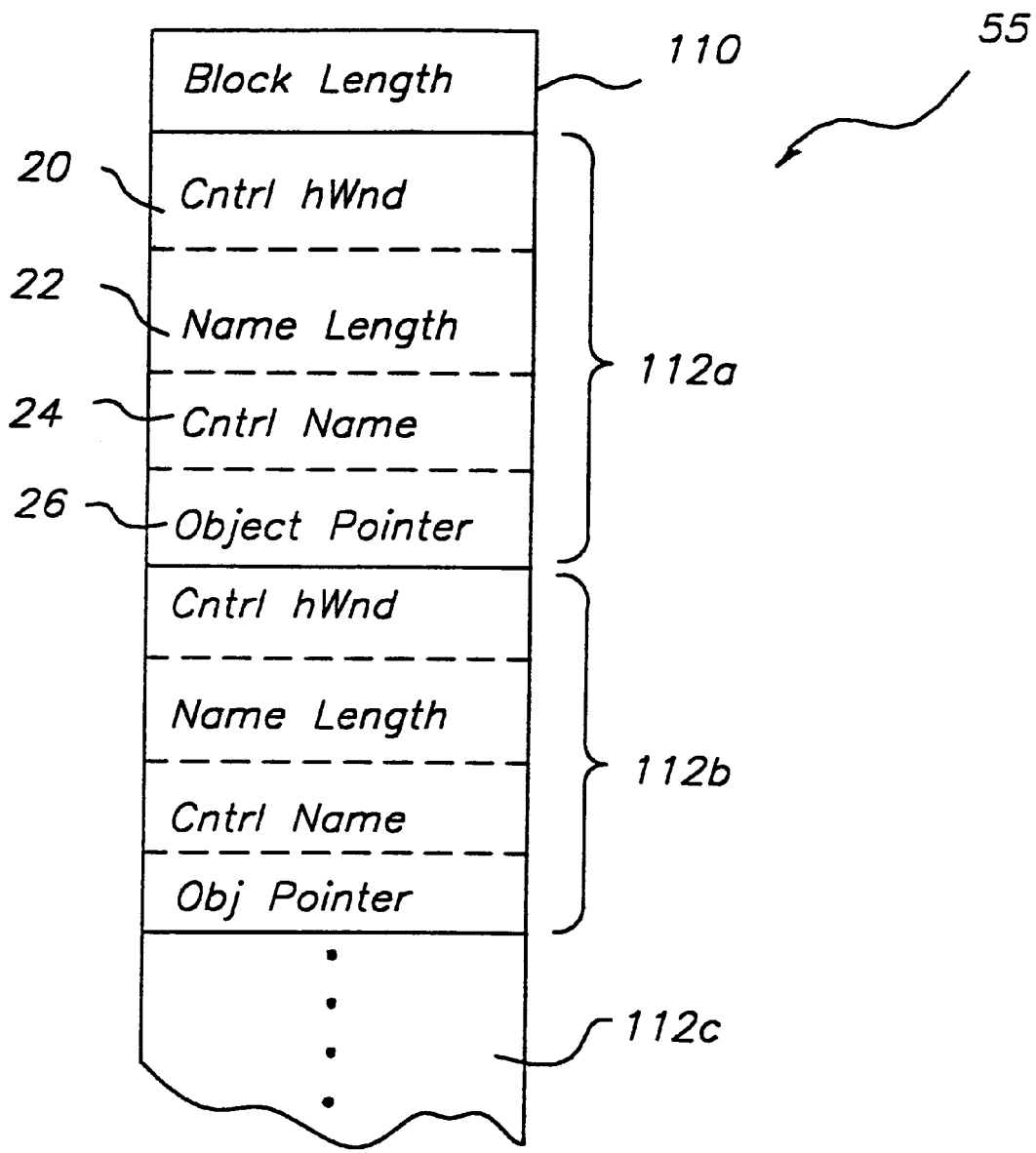
FIG. 2 is a detailed block diagram of a globally shared memory file employed by the embodiment of the present invention depicted in FIGS. 1A and 1B.

Referring back to FIG. 1A, this is accomplished by a memory-mapped file 55, located in working memory 30. Memory mapped file 55 is globally accessible by control objects 10, through a well-defined name in the working memory level of the computer system. Memory mapped file 55 holds an array of entries, a different entry 112 for each object 10 registered with the file to permit access to that control object 10. In each, entry there is provided a name field that is used to link all controls that communicate with each other. In each control that communicates directly with another control, the name (from the name field) of the latter is specified in the special property of the former. In the preferred embodiment, the special property is called "DestControl". Configuration details of memory mapped file 55 and its entries 112 are discussed below with reference to FIG. 2.

In the preferred embodiment, memory mapped file 55 comprises a heading 110 followed by an array of entries 112A, B, C, a different entry 112 for each control object 10 permitting access. The heading 110 is formed of a 4 byte long field labeled "Block_Length". That field provides an indication, in long integer format, of the total length of the memory mapped file 55. Each of the entries 112 is formed of four fields Cntrl_hWnd 20, Name_Length 22, Cntrl_Name 24 and Obj-Pointer 26.

Field Cntl_hWnd 20 is preferably 4 bytes long and holds the window handle of the respective control object 10. The "window-handle" defines the physical dimensions of the control window, window style, captions, and other information relative to a parent window (i.e., the container window).

The name of the subject control object is held as a character string in Cntrl_Name field 24. Because this field allows character strings of variable lengths, the Name_Length field 22 provides an indication of the length of the control name. Preferably Name_Length field 22 is 4 bytes long and holds the name length indication in long integer format. In one embodiment (further discussed in FIGS. 4A and 4B), the control names include "IMGEDIT", "IMGADMIN", "IMGTHUMB", "IMGSCAN", and "IMGANOT", for example.

Lastly, the Obj-pointer field 26 holds the IDispatch pointer to the subject control object 10. In the preferred embodiment Obj-pointer field 26 is 4 bytes long.

In sum, the memory-mapped file 55 provides the names and window handles of the controls 10 and the respective internal object pointers to the control objects 10 as exposed through the IDispatch interface 16. Use of memory mapped file 55 by control objects 10 in the preferred embodiment is then as follows and outlined in FIG. 3.

Each control object 10 (FIG. 1A) that permits direct access of its methods 12, properties 14 and window-handle, registers with the memory-mapped file 55 during the initial loading of the control 10, in an initialization process known as "InitInstance" at 61. Invoking InitInstance opens memory-mapped file 55, with a well known name, in exclusive mode, in a shared memory region 30 (at step 62 of FIG. 3). Opening the file 55 in exclusive mode ensures that, initially, the entries 112 in the file 55 are written without interruption or access by other users. Creating the file 55 in a well-known or control-recognizable name ensures that the entries 112 are read-accessible to all control objects 10 registered with the file 55, after the controls 10 are loaded. After memory mapped file 55 is opened, the subject control object 10 creates and appends to the file 55, an entry 112 for the object 10. Step 63 depicts this as registering the control entry. The newly added entry 112 contains the name, name length, window-handle and object pointer (from IDispatch) as discussed above in FIG. 2. After the new entry 112 is completed, the heading 110 of file 55 is updated to reflect the new (longer) length of the file 55 with the addition of new entry 112.

Figure 3:
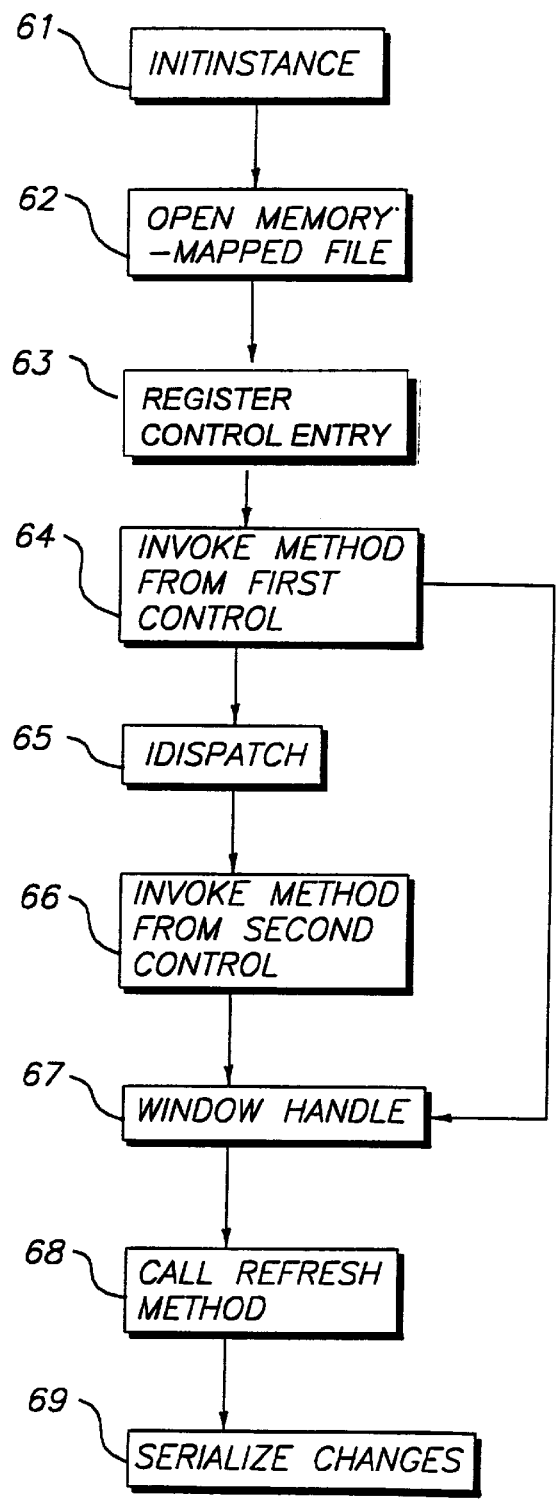
FIG. 3 is a process flow diagram describing the invention method.

During processing of data, a method or function of a first control object 10a is invoked at step 64 in FIG. 3. The control object 10a may determine that further processing by a certain method is needed/desired next. The control object 10a looks to memory mapped file 55. Control object 10a knows how to access the file 55 because of the well known (global) name of memory mapped file 55 in working memory 30, and control object 10a knows how to read file 55 because control 10a knows the structure (field configuration) of file 55. Control 10A knows what control to communicate with by comparing the name in the special property "DestControl" with the control name stored in the memory mapped file. Looking through the memory mapped file 55 and the list of registered/available controls 10 therein, the control object 10a determines a pertinent method of another control object 10b to call based on the function of the control. Using the object pointer field 26 contents from the file entry 112 for the desired control object 10b, control object 10a directly communicates with control object 10b through IDispatch at step 65. Specifically control object 10a directly invokes the desired method of object 10b (step 66).

Alternatively or in addition, control object 10a during processing may directly update the working window (or other data element) of another control object 10b. This is accomplished by the control object 10a obtaining the window handle of control object 10b through the memory mapped file entry 112 for control object 10b. After the first control object 10a obtains the window handle of control object 10b, control object 10a transmits (paints) subject data directly into the working window of control object 10b as desired. In addition, control object 10a takes the IDispatch object pointer from the file entry 112 for object 10b in memory mapped file 55 and directly invokes (calls) the refresh method of the control object 10b. In response, control object 10b becomes aware that its refresh method is being invoked and based on that understands that its working window contents have changed. Continuing through its logic, control object 10b sees the image data and acknowledges the existence of a window and data therein provided by control object 10a (unknown to object 10b). The control object 10b serializes the changes made to its window by the first control object 10a (step 69).

Serializing may be accomplished in two forms—by saving the data change, or by simply updating the window display because the data contents have changed. At step 69 of FIG. 3 either or both of these forms of serialization are affected.

In the preferred embodiment, the refresh method is a standard OLE method built into objects 10. The refresh method instructs the control object 10 to perform a repaint of its working window, to force update of the display. The repainting of the working window makes the new data visible to the end user. Thus the control object 10a call to the refresh method of control object 10b allows control object 10b to serialize the changes made to its window in a timely fashion.

In the preferred embodiment, the memory-mapped file 55 exists as a temporary memory object and is unloaded when the container program 13 goes out of scope (i.e., the application program 13 is cancelled or closed or the like). When the container program 13 goes out of scope, a reference count on the controls 10 is set to zero. When the reference count of a control 10 is zero, the control 10 is unloaded from working memory and its entry 112 in memory mapped file 55 is deleted. The controls 10 are unloaded through a standard entry point called ExitInstance. Preferably, ExitInstance is a standard entry point called when a DLL or OLE control is unloaded.

For purposes of illustration and not limitation, FIGS. 4A and 4B further demonstrate through an image viewing application 71, the above-described method and apparatus of the present invention. In FIG. 4A, Image application 71 serves as a controller of five OLE controls, namely Image Edit 73, Annotation toolbar 75, Thumbnail 76, Scan 74, and Administration 72. Using InitInstance, Image application 71 loads control objects 72, 73, 74, 75, 76 into working memory, each having respective methods and properties. Each control 72, 73, 74, 75, 76 creates and registers a respective entry 112 in the memory-mapped file 55 during InitInstance. FIG. 4B illustrates a screen shot of the image container application 71 of FIG. 4A.

By way of overview, the main working control is the Image Edit control object 73. By manipulating the properties and invoking the methods of this control object 73, an end-user is able to display and manage an image document. For example, through this control object 73, image documents are opened and created, and pages are viewed, added and removed. Viewed pages may be scrolled, scaled and rotated using various interactive tools.

The Annotation toolbar control object 75 allows customized toolbars to be built. For example, perhaps an end-user desires three different color highlighting pens on a working palette, rather than one pen with constantly changing properties. The annotation tool bar control object 75 provides an interactive interface and supporting processing to effect such a change.

The Thumbnail control 76 provides a visual interface that enables thumbnail renditions of individual document pages to be displayed as desired.

The Scan control 74 uses TWAIN drivers to communicate with industry-standard scanners to manage scanner options, control the scan process, and turn the raster image data into image document files.

The Administration control 72 operates behind the scenes (in background). The Administration control 72 provides image file support for local and redirected image files, as well as common dialog box support that is specific to images. General image file support allows users to create directories, delete directories and image files, retrieve image file attributes and manage image file attribute defaults. Users may append, insert, and replace pages in multi-page image files. Additionally, this control supports display of common dialog boxes, which provide image-specific options when selecting or printing image files.

With regard to the present invention, say for example image application 71 issues a scan and display command to scan control object 74. Scan control object 74 receives raw image data (raster data bits) from the scanner during a scanning operation. Scan control object 74 next determines what to do with the bits of data. According to the initial command, the scanned image is to be displayed, so the scan control object 74 looks at the "DestControl" property name and uses this name to search memory mapped file 55 for a display control. From the array of entries 112 in the memory mapped file 55, scan control object 74 finds the Image Edit control object 73 entry 112 created in the file 55 during InitInstance.

From that file entry 112, scan control object 74 obtains the window handle and IDispatch object pointer for the Image Edit control object 73. Using the window handle, scan control object 74 paints the scanned image data directly into the working window of Image Edit control object 73, to display the scanned image. In addition, using the IDispatch object pointer to the Image Edit control object 73, scan control object 74 directly calls the refresh method of the Image Edit object 73. In response to the refresh method call from the Scan control object 74, the Image Edit object 73 repaints the display in its working window, understanding that there is now new display data. That is, the refresh method of the Image Edit control 73 allows the control to serialize the changes in window content made by the Scan control 74.

In turn, the Image Edit control 73 looks to memory mapped file 55 to obtain the IDispatch object pointer to Administration Control 72. Image Edit Control 73 uses that pointer to directly access the methods in Administration Control 72 to save image data to disk.

It is this direct cooperation and communication between control objects 73, 74, 72, etc. to which the present invention is directed. Heretofore, the prior art systems required the image application 71 to (i) retrieve the scan image data from Scan object 74, and (ii) subsequently provide that data to Image edit control 73 for display in the desired working window and to Administration Control 72 for saving to disk. As such, the present invention provides increased efficiency and speed in accomplishing tasks/processing of data. The present invention also provides savings in memory space by refraining from loading control objects until command/runtime. Further, the present invention enables reuse of controls directly by other controls in an application container.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, the memory mapped file object pointer may be any other internal object pointer to the respective control object, as long as the pointer provides a desiring object direct access to the methods and properties of the desired control object.

The invention claimed is:

1. In a digital processor having a working memory for executing application programs, each application program being formed of a set of program objects and control objects, computer apparatus for enabling communications between control objects contained in a common application program, the apparatus comprising:

a plurality of control objects contained in a common application program residing in working memory, each control object (i) specifying functions, special properties, and data elements, and (ii) being initially defined for access and execution only through the common application program, the application program serving as a working object container; and a memory-mapped file in the working memory for enabling access to and communications between different control objects, the memory mapped file holding references to the control objects, a different reference for each control object, such that a first control object is able to directly access a second control object through the reference to the second control object in the memory mapped file, in a manner free of engaging the application program serving as a working object container in accessing the second control object.

2. Computer apparatus as claimed in claim 1 wherein the memory-mapped file further enables a control object to invoke the functions and share and update the data elements of another control object through the references used to access respective control objects.

3. Computer apparatus as claimed in claim 1 wherein the memory-mapped file is formed of (a) an indication of block length for indicating memory block size of the file, and (b) an array of entries for listing indications of the control objects and functional descriptors thereof, there being a different entry for each control object, and each entry being formed of a set of fields, including a name field for indicating the respective control object and other fields for indicating respective functional descriptors.

4. Computer apparatus as claimed in claim 1 wherein each control object is an object-linking-and-embedding control, and the application program is an object-linking-and-embedding control container.

5. Computer apparatus as claimed in claim 1 wherein the memory-mapped file provides a recognizable name in working memory to enable read-only access of the file by the control objects.

6. Computer apparatus as claimed in claim 1 wherein each control object provides a special property containing an indication of the respective control object to communicate with as specified in the memory-mapped file.

7. Computer apparatus as claimed in claim 2 wherein the functions include a refresh method such that when a control object directly updates a data element of a certain other control object, the control object invokes the refresh method of the certain other control object to serialize the updated data element.

8. Computer apparatus as claimed in claim 3 wherein the functional descriptors include a respective window handle for each control object, each window handle defining screen elements of a viewing window including window size, location and style.

9. Computer apparatus as claimed in claim 3 wherein each entry in the memory mapped file includes a referencing field holding a pointer to the respective control object.

10. Computer apparatus as claimed in claim 4 wherein each control object includes connectable software, the connectable software including binary codes.

11. Computer apparatus as claimed in claim 10 wherein a communication between the controls is established through a common object model which provides a mechanism for combining the binary codes of different control objects.

12. In a digital processor having working memory for executing application programs, a method for enabling communications between control objects contained in a common application program, the method comprising the steps of:

providing a plurality of self-contained objects contained in a common application program residing in working memory, each object specifying functions and data elements, each object being initially defined for access and execution only through the common application program, the common application program serving as a working object container;

providing a memory-mapped file in the working memory;

holding references to the objects in the memory mapped file, in a manner enabling access to and communications directly between different objects, there being a different reference for each object; and from a working object, directly accessing a desired object through the reference to the desired object as provided in the memory mapped file, in a manner free of engaging the application program serving as a working object container in accessing the desired object.

13. A method as claimed in claim 12 further comprising the step of enabling the working object to invoke the functions and share and update the data elements of a desired object through the references.

14. A method as claimed in claim 12 wherein the step of holding references in the memory-mapped file further includes providing in the memory-mapped file an indication of memory block size of the file and an array of entries for holding the references and listing object functional descriptors, there being a different entry for each object and each entry being formed of a set of fields including a name field for indicating the respective object and other fields for indicating respective functional descriptors.

15. A method as claimed in claim 12 wherein the step of providing objects includes providing object-linking-and-embedding control objects and the common application program is an object-linking-and-embedding control container.

16. A method as claimed in claim 12 wherein the step of providing a memory mapped file includes providing, in working memory, a recognizable name for the memory-mapped file to enable read-only access to the file by the objects.

17. A method as claimed in claim 12 wherein the step of directly accessing a desired object includes holding an indication of the desired object as a property of the working object.

18. A method as claimed in claim 13 further providing in the functions a refresh method such that, when the working object directly updates a data element of a certain other object, the working object invokes its refresh method and the refresh method of the certain other object to serialize the updated data element.

19. A method as claimed in claim 14 further providing in the functional descriptors a respective window handle for each object, each window handle defining screen elements of a viewing window including window size, location and style.

20. A method as claimed in claim 14 wherein the step of providing an array of entries further includes providing a referencing field holding a pointer to the respective object.

21. A method as claimed in claim 15 wherein each control object includes connectable software, the connectable software including binary codes.

22. A method as claimed in claim 21 further comprising establishing a communication between the controls through a common object model which provides a mechanism for combining the binary codes of different control objects.

* * * * *